United States Patent [19]

Nakazawa et al.

[11] 4,112,309
[45] Sep. 5, 1978

[54] APPARATUS FOR MEASURING THE LINE WIDTH OF A PATTERN

[75] Inventors: Kiwao Nakazawa, Tokyo; Akikazu Tanimoto, Kawasaki, both of Japan

[73] Assignee: Nippon Kogaku K.K., Tokyo, Japan

[21] Appl. No.: 740,495

[22] Filed: Nov. 10, 1976

[30] Foreign Application Priority Data

Nov. 22, 1975 [JP] Japan .................. 50-139740

[51] Int. Cl.² ........................................... G01N 21/30
[52] U.S. Cl. ................... 250/560; 250/234; 250/236; 356/120; 356/209
[58] Field of Search ............... 250/234, 236, 560, 571, 250/572, 578; 356/120, 156, 160, 209

[56] References Cited

U.S. PATENT DOCUMENTS

| | | | |
|---|---|---|---|
| 3,904,293 | 9/1975 | Gee | 356/120 X |
| 3,971,956 | 7/1976 | Jakeman et al. | 250/571 |

FOREIGN PATENT DOCUMENTS 342,889  1/1960  Switzerland .................. 250/578 X

*Primary Examiner*—Lawrence J. Dahl
*Attorney, Agent, or Firm*—Shapiro and Shapiro

[57] ABSTRACT

An apparatus for photoelectrically detecting the position of each of the edges of a line having the opposite edges thereof formed substantially parallel to each other on an a substrate thereby to measure the width of the line, comprises a source of coherent light, means for condensing the coherent light into a tiny light spot which illuminates the line, means for imparting to the tiny light spot a minute oscillation having an amplitude less than the width of the line, means for providing relative movement of the tiny light spot and the line so that diffracted light may be created at each of the edges of the line, a first photoelectric conversion element for receiving chiefly the diffracted light created at one of the edges of the line, a second photoelectric conversion element for receiving chiefly the diffracted light created at the other edge of the line, and a circuit for producing position signals corresponding to the edges of the line from the output signals from the first and second photoelectric conversion elements.

3 Claims, 15 Drawing Figures

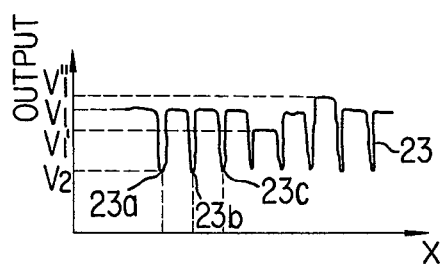
FIG. 4
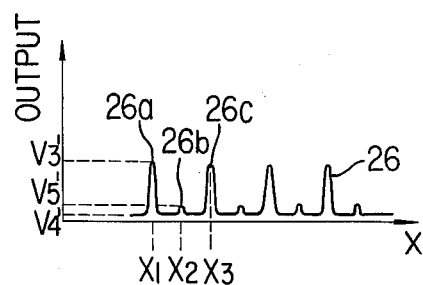
FIG. 7-a
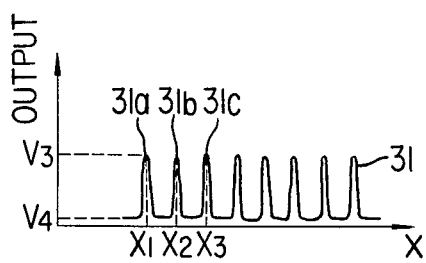
FIG. 5
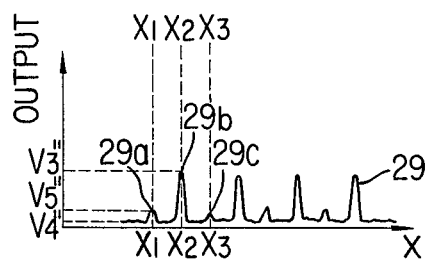
FIG. 7-b
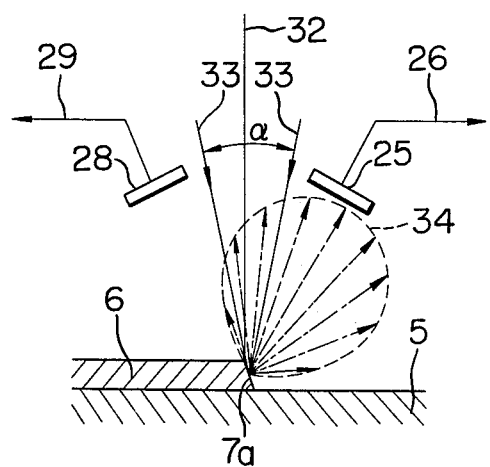
FIG. 6

APPARATUS FOR MEASURING THE LINE WIDTH OF A PATTERN

BACKGROUND OF THE INVENTION

1. Field of the Invention

This invention relates to an apparatus for measuring the line width of a pattern formed on a substrate. More particularly, it relates to such an apparatus for measuring the line width of a pattern on a substrate by the use of coherent light diffracted by the line edges of the pattern.

2. Description of the Prior Art

In the process of forming an IC pattern on a semiconductor wafer, it is very important to determine, by accurate measurement whether or not the line width of a pattern on the wafer is exactly formed to an intended width, in order to ensure the electrical performance of the IC chip ultimately obtained. Therefore, the present invention will hereinafter be described with respect to a device for measuring the line width of an IC pattern formed on a semiconductor wafer (hereinafter referred to as a chip pattern), although the invention is not restricted to the measurement of the line width of a chip pattern but is widely applicable to the measurement of the width of other patterns having such properties as will hereinafter be described.

The conventional method of automatically measuring the line width of a chip pattern will generally be explained by reference to FIGS. 1 and 2 of the accompanying drawings. In FIG. 1, a light source for illumination 1, a condenser lens 2, a half-mirror 3 and a microscopic objective lens 4 together constitute a microscopic projecting illumination system. A semiconductor wafer 5 is set on a base or stage 8 which is movable in the direction of arrow X. A chip pattern 6 is formed on the semiconductor wafer 5, and the enlarged optical image of the chip pattern 6 may be focused through a slit 9 by the objective lens 4 of the microscope. As the movable stage 8 is moved in the direction of arrow X, the variation in the quantity of light passed through the slit 9 may be converted into an electrical signal 12 by a photoelectric conversion element 11, whereby there may be obtained the output as indicated by 12 in FIG. 2. As seen in FIG. 2, the electrical signal 12 depends on the optical contrast of the chip pattern 6, that is, the signal output level $V_1$ of the chip pattern 6 is higher than the signal output level $V_2$ of the surrounding surface when the reflection factor of the chip pattern 6 is higher than that of the surrounding surface. Detection of the line edges $7a$, $7b$, $7c$ of the chip pattern is accomplished by setting up a slice level $V_0$ intermediately of the output levels $V_1$ and $V_2$ so provided and by making the points $13a$, $13b$, $13c$ whereat the output signal 12 slices the slice level $V_0$ correspond to the line edges $7a$, $7b$, $7c$ of the chip pattern, thereby obtaining line edge position signals.

Now, such conventional method of measuring the line width of a chip pattern has suffered from two problems which will be mentioned below.

A first problem concerns the optical contrast of the chip pattern to be measured. In the process of forming an IC pattern on a semiconductor wafer, as is well-known, the wafer surface is subjected to various treatments and numerous layers of thin film are superposed upon one another. Thus, the contrast of the optical image of the chip pattern so provided is not uniform but varies under the influence of the treatments applied thereto. In the case as shown in FIG. 2 wherein the chip pattern signal is such that the contrast of the chip pattern is varied by the photoelectric conversion signal 12 and may only result in the level $V_{1'}$, even if the line width of the chip pattern on the wafer is invariable, measurement effected with the slice level fixed to $V_0$ would cause errors to the line edge position signals $13d$ and $13e$, in contradistinction with the case of a chip pattern wherein the photoelectric conversion signal has been at the level $V_1$. To eliminate such errors, it is necessary to make the slice level $V_0$ correspond to the variation in contrast of the chip pattern image by some method and re-set the slice level $V_0$ by some method. Further, in the cases where the contrast of the chip pattern image is deteriorated to the extent that the photoelectric conversion signal is not sufficiently obtainable, the measurement itself could become impossible.

A second problem is that, in the example shown in FIGS. 1 and 2, the use of the microscopically projected image of the chip pattern to be measured causes the line edges of the chip pattern image to be affected by the optical transfer function (OTF) of the objective lens of the microscope. Therefore, to ensure more accurate measurement of the line edges, it is necessary to determine the slice level of the photoelectric conversion signal with the influence of the OTF of the objective lens taken into account; consequently it is extremely difficult to determine the line edges of the optically formed images of chip patterns which are formed under various conditions.

SUMMARY OF THE INVENTION

It is an object of the present invention to use coherent light for the detection of the line edges of a chip pattern and thereby enable photoelectric conversion signals of the line edges to be produced with a very good S/N ratio independently of the optical contrast of the chip pattern, and without contacting the pattern.

It is another object of the present invention to use coherent light for the detection of the line edges of a chip pattern and thereby enable photoelectric conversion signals of the line edges to be directly obtained from the chip pattern on the wafer and thus prevent the detection of the line edges from being affected by the OTF of the image formation lens.

To achieve these objects, the apparatus of the present invention photoelectrically detects the position of each of the edges of a line having the opposite edges thereof formed substantially parallel to each other on a substrate, to thereby measure the width of the line. In a preferred embodiment the apparatus comprises a light source emitting coherent light, means for condensing the coherent light into a tiny light spot and illuminating the line with the light spot, means for imparting to the tiny light spot a minute oscillation having an amplitude less than the width of the line, means for moving the tiny light spot and the line relative to each other so that diffracted light may be created at each of the edges of the line, first photoelectric converter means for receiving chiefly the diffracted light created at one of the edges of the line, second photoelectric converter means for receiving chiefly the diffracted light created at the other edge of the line, and a circuit for producing position signals corresponding to the edges of the line from the output signals from the first and second photoelectric converter means.

The above objects and other features of the invention will become fully apparent from the following detailed description thereof taken in conjunction with the accompanying drawings.

BRIEF DESCRIPTION OF THE DRAWINGS

FIGS. 3 to 7 illustrate the basic method of measurement according to the present invention.

DESCRIPTION OF THE PREFERRED EMBODIMENTS

Figure 3:
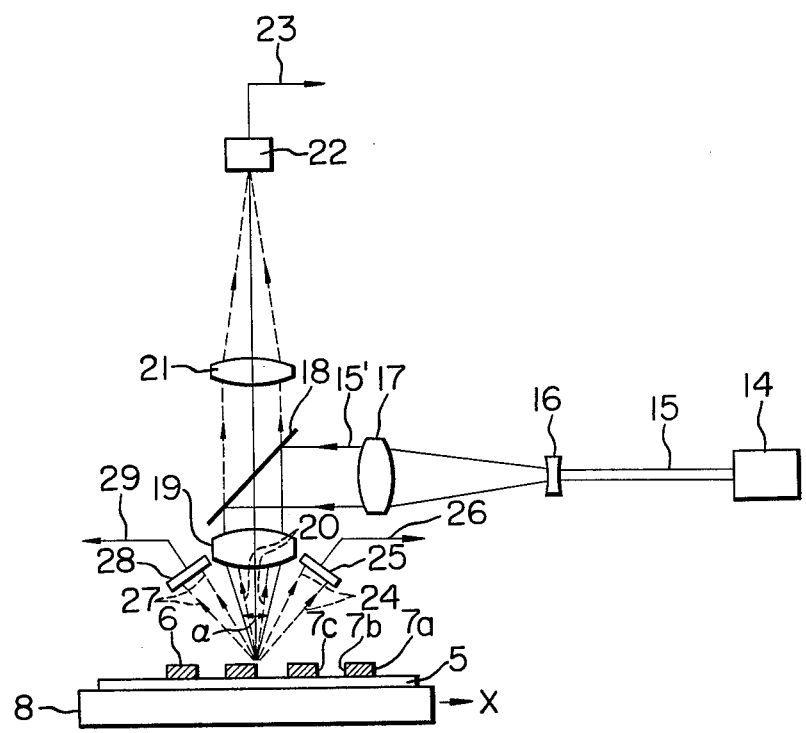

FIG. 3 shows the principle underlying the detection of the line edges of a chip pattern according to the present invention. In FIG. 3, designated by 14 is a source of coherent light which may usually be a laser. The beam 15 from the laser 14 may be expanded into a parallel beam 15' by collimator comprising lenses 16 and 17, and then reflected by a half-mirror 18 toward an objective lens 19. The parallel beam 15' may be condensed by the objective lens 19 at the back focus position thereof, so as to form a tiny laser light spot. The size of the tiny spot so formed is determined by the diameter of the expanded parallel beam 15' and the value of the focal length of the objective lens 19, in other words, by the angular aperture $\alpha$ of the objective lens 19. The dimensions of the tiny spot form an essential factor for increasing the resolving power of the line width of a chip pattern to be measured. An IC chip pattern 6 formed on the surface of a semiconductor wafer 5 on a movable stage 8 is set just at the back focus position of the objective lens 19. Thus, with the movement of the movable stage 8 in the direction of arrow X, the chip pattern 6 may be scanned by the tiny laser spot.

Figure 1:
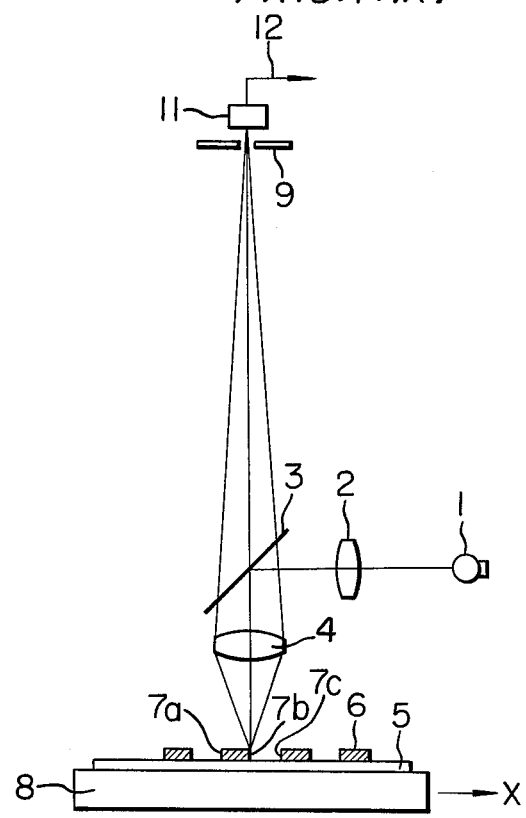
FIGS. 1 and 2 illustrate the method of measurement according to the prior art.
Figure 2:
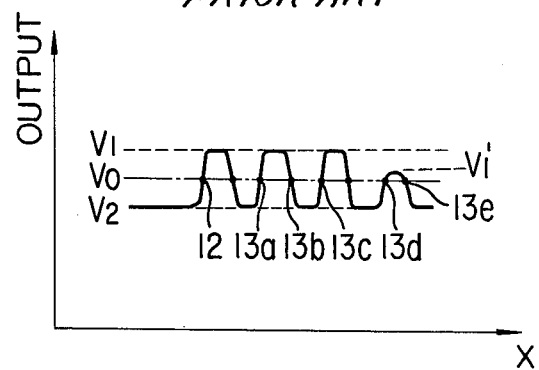

The IC chip pattern formed on the semiconductor wafer usually has concave-convexity of the order of several microns or less and accordingly, the line edges of the chip pattern are formed with falls of the order of serveral microns or less. Now, if the chip pattern is scanned by the tiny laser spot, the characteristic of the reflected light from the chip pattern will exhibit phenomena for the flat portions that differ those for the line edges or falls of the chip pattern. The characteristic of the reflected light from the flat portions of the chip pattern is such that the quantity and directionality of the reflected light are determined by the reflection factor of the chip pattern and the roughness of the pattern surface. In the case of the IC chip pattern, the reflection factor thereof differs in accordance with the conditions under which the chip pattern is formed, but the pattern surface usually exhibits a directionality of reflection approximately the same as mirror reflection even if it has some degree of roughness. Thus, in FIG. 3, the reflected light from the flat portions of the chip pattern is subjected to substantially regular reflection so that most of such reflected light returns into the beam contained within the angular aperture $\alpha$ of the objective lens 19, and the quantity of such light depends on the reflection factor of the chip pattern. On the other hand, the reflection factor of the chip pattern in the line edge portions thereof exhibits a directionality of reflection different from that of the reflected light from the flat portions because the condensed laser beam is diffracted by the falls formed in the line edge portions. More specifically, at the line edges of the chip pattern, there is created, due to diffraction, a reflected beam progressively expanded with a directionality greater than the angle $\alpha$, in addition to the reflected beam returning into the angular aperture $\alpha$ of the objective lens. Thus, the characteristic of this reflected light resulting from diffraction is a unique phenomenon created only by the stepped structure of the line edges; in other words, by utilization of such phenomenon, it becomes possible to detect the line edges of the chip pattern. In addition, only by using a source of coherent light like laser light as the source for illuminating the chip pattern, is it possible to create such a phenomenon pronouncedly, and the excellent properties of the laser, which is monochromatic and very bright enable detection of the line edges to be effected with an excellent S/N ratio. Further, such detection of the line edges may be accomplished by directly illuminating the chip pattern with the laser beam, and it is thus possible to eliminate the disadvantage that the detection of the line edges of the chip pattern is affected by the OTF of the image formation optical system, as was experienced in the prior art method as shown in FIG. 1.

Turning back to FIG. 3, the principle of the present invention will further be described. In FIG. 3, when the chip pattern 6 is scanned by the tiny laser spot, the light reflected into the angular aperture $\alpha$ of the objective lens 19 again passes through the objective lens 19 and further through the half-mirror 18 and the condenser lens 21 to the photoelectric conversion element 22, by which there is obtained the photoelectric conversion signal 23 of the chip pattern. The output signal resulting from the photoelectric conversion of such reflected light returning into the angular aperture $\alpha$ of the objective lens 19 is as shown in FIG. 4. In FIG. 4, the output signal is designated by 23, the photoelectric conversion outputs resulting from the flat portions of the chip pattern being scanned by the laser spot are designated by $V_1$, $V_1'$, and $V_1''$, and the photoelectric conversion output obtained when the line edges of the chip pattern are scanned by the laser spot is designated by $V_2$. Since the photoelectric conversion outputs resulting from the flat portions of the chip pattern being scanned are proportional to the reflection factor of the chip pattern as already noted, the photoelectric conversion output in the present instance assumes the various output levels such as $V_1$, $V_1'$ and $V_1''$. The photoelectric conversion output obtained when the line edges of the chip pattern are scanned assumes a lower output level than the photoelectric conversion outputs resulting from the flat portions of the chip pattern being scanned, as indicated at $V_2$ in FIG. 4, because the laser beam is diffracted by the line edge portions and most of the diffracted light is expanded beyond the angular aperture $\alpha$ of the objective lens 19. Thus, if an appropriate signal processing is effected to detect the peak position 23a, 23b, 23c, etc. of the photoelectric conversion output signal 23, it will become possible to detect the line edges 7a, 7b, 7c etc. of the chip pattern. However, where the detection of the line edges is carried out by the use of such method, any pronounced variation in reflection factor of the flat portions of the chip pattern would cause great variation in the photoelectric conversion output at the flat portions and this problem must be taken into consideration in the processing of the line edge detection signals. Therefore, to enable the line edge detection to be effected relatively independently of the influence of the variation in reflection factor of the chip pattern, the photoelectric conversion elements 25 and 28 may be disposed symmetrically about the optical axis of the objective lens 19 and at angular positions beyond the angular aperture α, for example, in FIG. 3, whereby the photoelectric conversion outputs from the elements 25 and 28 will be such as shown in FIG. 5. In FIG. 5, the photoelectric conversion output from the element 25 or 28 is designated by 31, the output signal level at the flat portions of the chip pattern is designated by $V_4$, and the output signal level at the line edges of the chip pattern is designated by $V_3$. The reflected light provided when the laser spot scans the flat portions of the chip pattern, as already described, exhibits a directionality of reflection approximate to regular reflection, and in FIG. 3 almost all of the reflected light is contained within the angular aperture α of the objective lens 19, so that the photoelectric conversion output $V_4$ in this instance (FIG. 5) is constant almost independently of the influence of the reflection factor of the chip pattern, but when the laser spot illuminates the line edges of the chip pattern, the reflected light spreads over a wider area than the angular aperture α of the objective lens 19, in FIG. 3, due to the diffraction at the line edges, so that diffracted light rays 24 and 27 are received by the photoelectric conversion elements 25 and 28, thus providing photoelectric conversion output signals 26 and 29. In this instance, the level $V_3$ of the output signal 26 or 29 assumes a higher level than the output signal level $V_4$ at the flat portions of the chip pattern. Thus, the positions of the peaks 31a, 31b, 31c etc. of the photoelectric conversion output signal 31 in FIG. 5 are detected as the line edges by appropriate signal processing while, on the other hand, the position coordinates $X_1$, $X_2$, $X_3$, etc. of the movable stage 8, for example, are obtained in synchronsim with said line edge position signals to thereby enable the line width of the chip pattern to be measured.

It has already been noted that the IC chip pattern formed on the semiconductor wafer has falls of the order of several microns in the line edge portions thereof. These falls are not always vertical but often inclined as shown in FIG. 6. Where the falls are so inclined, the directionality characteristic of the reflected light due to the diffraction at the line edges does not present the symmetrical expansion with respect to the optical axis 32 of the laser beam which illuminates the chip pattern, but presents deviations resulting from the structure of the falls. In FIG. 6, reference numeral 5 designates a semiconductor substrate subjected to a certain treatment and it is to be understood that a chip pattern 6 is formed on the surface thereof and that the line edge 7a of the chip pattern has a fall inclined to some degree. The laser beam 33 for illuminating the chip pattern is condensed on the chip pattern with a predetermined angle α. If the line edge 7a is rightwardly downwardly inclined as shown in FIG. 6, the directionality of reflection of the laser beam at the line edge has a characteristic such as indicated by dot-and-dash lines 34, namely, rightward deviations with respect to the optical axis of the illuminating laser beam, so that the quantity of the reflected light impinging on the photoelectric conversion element 25 is greater than that impinging on the photoelectric conversion element 28. Conversely, if the line edge of the chip pattern is leftwardly downwardly inclined, the directionality of the reflected light has leftward deviations with respect to the optical axis 32 of the laser beam. Therefore, the photoelectric conversion outputs produced by the photoelectric conversion elements 25 and 28 as the result of scanning the chip pattern with such shaped line edges by the laser spot differ from each other due to the difference in shape between the falls of the line edges of the chip pattern, as shown in FIGS. 7-a and 7-b. FIG. 7-a shows the output signal 26 from the photoelectric conversion element 25, and FIG. 7-b shows the output signal 29 from the photoelectric conversion element 28. It is now assumed that as the movable stage 8 is moved in the direction X as shown in FIG. 3, the line edges of the chip pattern are successively scanned by the laser spot in the order of 7a, 7b and 7c and that the line edges are alternately inclined in such a manner that the line edge 7a is a rightwardly downwardly inclined fall and the line edge 7b is a leftwardly downwardly inclined fall. Then, the photoelectric conversion output 26, as shown in FIG. 7-a, assumes a high output level $V_3'$ having peaks 26a and 26c at the line edges 7a and 7c and assumes a low output level $V_5'$ having a peak 26b at the line edge 7b. The difference between the output levels $V_3'$ and $V_5'$ varies with the shapes of the line edges, but the directions of the inclination of the falls at the line edges of the chip pattern may be known by comparing the output levels $V_3'$ and $V_5'$. On the other hand, the photoelectric conversion output signal 29, as is shown in FIG. 7-b and conversely to the case of FIG. 7-a, assumes a low output level $V_5''$ having peaks 29a and 29c at the line edges 7a and 7c and assumes a high output level $V_3''$ having a peak 29b at the line edge 7b. It will thus be seen that in order to detect the positions of the line edges of the chip pattern from the photoelectric conversion output signals 26 and 29, a circuit for taking the sum of the output signals 26 and 29 may be provided and the output signal of the summing circuit will be identical to the signal 31 shown in FIG. 5, so that detection of the peak positions of the signal thus provided will result in the ultimately intended detection. Instead of providing such a summing circuit, it is also possible to individually detect the peak positions of the output signals 26 and 29 which have high output levels and to use them as the successive/line edge position signals.

In FIG. 3, detection of the reflected light rays 24 and 27 resulting from the diffraction at the line edges is effected by the provision of separate photoelectric conversion elements 25 and 28, but if an optical system discrete from the objective lens 19 is provided so as to condense the reflected light rays 24 and 27 only upon a single photoelectric conversion element, the output signal from such single photoelectric conversion element may always be the sum of the aforementioned photoelectric conversion output signals 26 and 29.

The principle of the present invention has hitherto been described with respect to how to obtain the line edges of the chip pattern in the form of photoelectric conversion output signals, but hereinafter description will be made of an embodiment in which the principle of the present invention is applied to accomplish measurement of the line width of a chip pattern.

Figure 8:
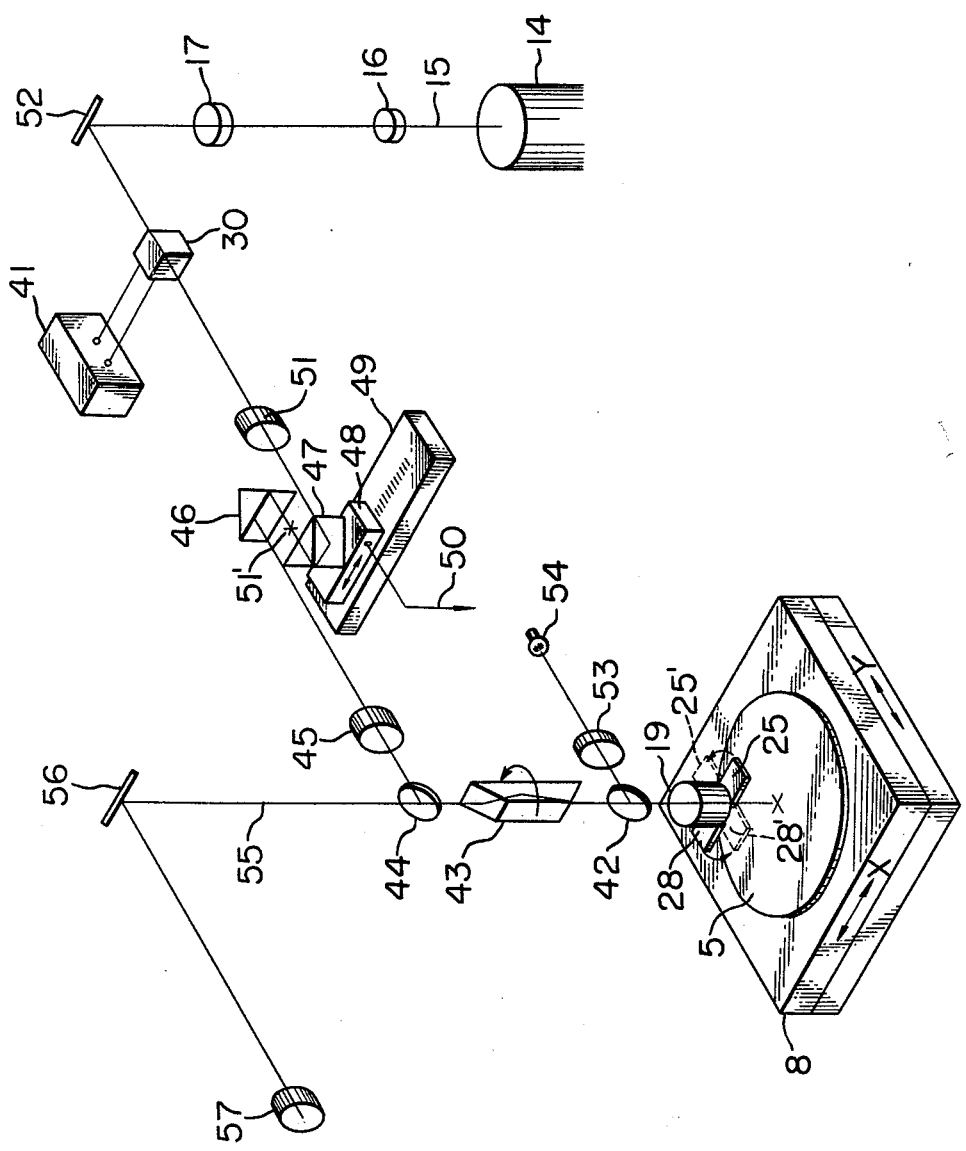
FIGS. 8, 9, and 10a–10d illustrate a specific embodiment of the present invention.

FIG. 8 schematically shows a specific embodiment of the apparatus for measuring the line width of a chip pattern. In FIG. 8, there is seen a laser 14, a laser beam 15 and collimator 16, 17 for collimating the laser beam into a predetermined diameter of parallel beam. After passing through the collimator, the laser beam enters a deflecting element 30 through a mirror 52. The deflecting element 30 is set at the back focus position of a condenser lens 51 and cooperates with an oscillator 41 to oscillate the laser beam at a predetermined frequency and a predetermined amplitude and within a predetermined range of angle. After passing through the deflecting element 30, the parallel laser beam is condensed into a laser spot by the condenser lens 51 at the back focus position 51' thereof, and the laser beam so condensed effects a simple harmonic oscillation on the focal plane of the condenser lens 51. The laser beam once condensed by the condenser lens 51 is again collimated by a second objective lens 45 which is set so that the front focus thereof lies at the back focus 51' of the condenser lens 51, and then the laser beam passes through a half-mirror 44, an image rotator 43 and a half-mirror 42 to a first objective lens 19, by which the beam is again condensed so as to form a tiny spot for illuminating the chip pattern on a semiconductor wafer 5. The amplitude of the deflecting element 30 is set so that the tiny laser spot so provided to illuminate the chip pattern may be subjected to a simple harmonic oscillation at an amplitude less than the minimum line width of the chip pattern. The spot size and simple harmonic oscillation amplitude of the tiny laser spot thrown upon the chip pattern are determined by a microscopic optical system comprising the first objective lens 19 and the second objective lens 45. As specific values, 1.0 micron and 0.5 micron may readily be obtained for the spot size and the simple harmonic oscillation amplitude, respectively.

The semiconductor wafer 5 is set on a XY stage 8 and the positioning of the chip pattern to be measured is accomplished by movement of the XY stage 8 and a viewing optical system. The viewing optical system comprises a projecting optical system consisting of a light source 54 for viewing, condenser lens 53 and half-mirror 42, and a microscopic optical system for viewing consisting of the first objective lens 19 and a second objective lens 57 for viewing.

Although various methods of scanning the chip pattern would be available to measure the line width of the chip pattern by the use of the tiny laser spot thrown upon the chip pattern, the embodiment of FIG. 8 is shown to use a method of optically scanning the chip pattern. More specifically, two rectangular prisms 46 and 47 are set between the condenser lens 51 and the second objective lens 45, and the rectangular prism 47 is securely mounted on a stage 48 movable in the same direction as the simple harmonic oscillation created by the deflecting element 30. The amount of movement of the movable stage 48 is read by a linear encoder comprising a detecting head within the stage and a linear scale 49, producing an output signal 50. Therefore, if the movable prism 47 is moved in a direction to cause the tiny laser spot to scan the chip pattern, the laser spot formed by the condenser lens 51 at the back focus position 51' thereof will scan in a predetermined direction within the back focus plane of the condenser lens 51 and the amount of such scanning will be reduced by an amount corresponding to the negative magnification of the microscopic optical system comprising the first objective lens 19 and the second objective lens 45 as the tiny laser spot scans the chip pattern. It will thus be seen that highest possible enhancement of the resolving power for the measurement of the line width of the chip pattern may be attained by taking the following factors into account: to provide a greatest possible magnification of the microscopic optical system comprising the first objective lens 19 and the second objective lens 45; to apply a mechanical magnification to the moving mechanism for the movable stage 48; and to increase the divisions of the linear encoder. In fact, by taking these into account, the resolving power for the measurement of the chip pattern line width can be enhanced to 1/100 of a micron.

Figure 9:
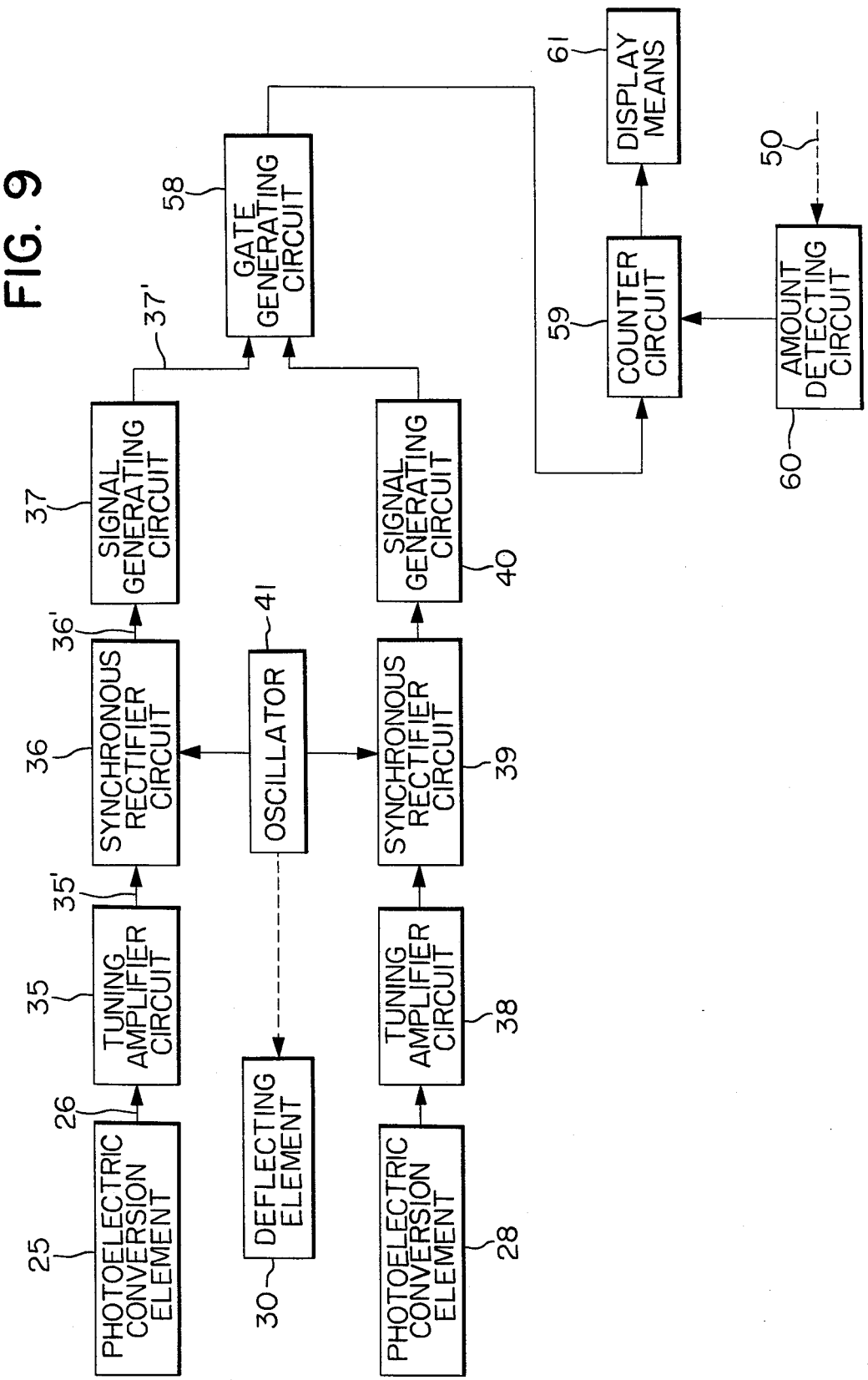
Figure 10:
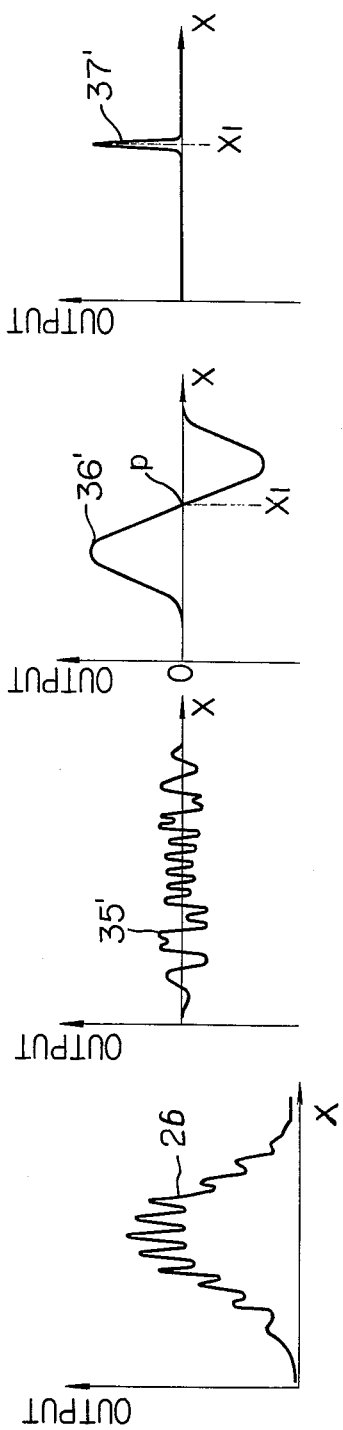

Now, in FIG. 8, when the chip pattern is scanned by the tiny laser spot thrown thereupon, the laser beam reflected from the chip pattern is received by the photoelectric conversion elements 25 and 28. As already described in connection with FIG. 3, the photoelectric conversion elements 25 and 28 are set in such directions that the chip pattern is scanned outwardly of the angular aperture of the first objective lens 19. How the line width of the chip pattern is measured by the use of the photoelectric conversion output signals then produced by the photoelectric conversion elements 25 and 28 will hereinafter be described by reference to FIGS. 9 and 10. FIG. 9 is a block diagram showing an example of the electrical signal processing system involved in the measurement of the chip pattern line width. FIG. 10 illustrates the states of the signals during the electrical signal processing in the above-described embodiment.

In FIG. 9, the output signals from the photoelectric conversion elements 25 and 28 are respectively amplified by tuning amplifier circuits 35 and 38, and then enter synchronous rectifier circuits 36 and 39. Reference signal for driving the deflecting element 30 is supplied from the oscillator 41 to the synchronous rectifier circuits 36 and 39. The output signals from these synchronous rectifier circuits 36 and 39 pass through line edge position signal generating circuits 37 and 40 to a gate generating circuit 58, the output of which is in turn applied to a counter circuit 59. When the output signals from the synchronous rectifier circuits 36 and 39 enter the line edge position signal generating circuits 37 and 40 and if the difference in level between the signals from the two photoelectric conversion elements 25 and 28 is small, the line edge position signals are delivered from the signal generating circuits 37 and 40 to the gate generating circuit 58 at the same time; if the difference in level between the signals from the two photoelectric conversion elements 25 and 28 is great, the line edge position signal is delivered from one of the signal generating circuits 37 and 40 to the gate generating circuit 58.

The gate generating circuit 58 opens its gate in response to the line edge position signal or signals from one or both of the signal generating circuits 37 and 40 and sends a count starting signal to the counter circuit 59, whereafter the gate generating circuit 58 closes its gate in response to the subsequent line edge position signal or signals from the other or both of the signal generating circuits, thereby permitting the counter to effect counting. The counter circuit 59 has applied thereto an output signal from a moving amount detecting circuit 60 which receives the output signal 50 from the linear encoder to effect a predetermined division and puts out a number of pulses corresponding to the amount of the chip pattern scanned by the tiny laser spot. The number of pulses corresponding to the measured value of the line width of the chip pattern is counted in accordance with the gate signal from the gate generating circuit 58 and sent to display means 61, which thus digitally displays the line width of the chip pattern.

The method of signal processing the output signal of the photoelectric conversion element 25 to produce the signal applied to the gate generating circuit 58 will be described more specifically. The tiny laser spot for illuminating the chip pattern is caused to scan in the X-direction, and when the laser spot scans the vicinity of a line edge of the chip pattern, the photoelectric conversion element 25 produces the output signal 26 as shown in FIG. 10-a. As already noted, the output signal 26 assumes its maximum level at the line edge of the chip pattern, but the tiny laser spot scanning the chip pattern is being subjected to a simple harmonic oscillation at a predetermined amplitude and therefore, if the frequency of the simple harmonic oscillation is set to a value sufficiently greater than the velocity at which the chip pattern is scanned, the output signal 26 will be modulated by the frequency of the simple harmonic oscillation of the tiny laser spot, as indicated at 26 in FIG. 10-a. The output signal is such that at the position corresponding to the center of the line edge portion, the DC component assumes its maximum value and the other component has a frequency of $2f$, where $f$ is the frequency of the simple harmonic oscillation, while at the opposite sides deviated from the center of the line edge portion, there is a component having a frequency $f$. Thus, the position signal detected is contained in the frequency range of $f$ to $2f$. If such output signal 26 is processed so that only the frequency components from at least the oscillation frequency component of the tiny laser spot up to twice such frequency component are passed through a band-pass filter circuit 35, there will be provided an output signal 35' as shown in FIG. 10-b. That is, at the time when the center of oscillation of the tiny laser spot lies at the line edge of the chip pattern, the output signal 35' is a signal having a frequency twice the oscillation frequency of the tiny laser spot and before and after that time, the output signal 35' is a signal containing the same frequency component as the oscillation of the tiny laser spot. If the output signal 35' is applied to the synchronous rectifier circuit 36 and subjected to synchronous rectification with the reference signal used as the oscillation frequency of the tiny laser spot, namely, the frequency of the oscillator 41, the synchronous rectifier circuit 36 will produce an output 36' as shown in FIG. 10-c. In FIG. 10-c, the point P at which the output signal 36' crosses the output signal level 0 after having exceeded a predetermined level corresponds to the case where the center of oscillation of the tiny laser spot lies just at the line edge of the chip pattern, so that the moment when the output signal 36' reaches the point P is detected by the line edge position signal generating circuit 37, which thus generates a line edge position signal 37' (FIG. 10-d). When this occurs, the gate generating circuit 58 opens its gate to deliver a count starting signal to the counter circuit 59. Thereby, the counter circuit starts to count the pulses from the moving amount detecting circuit 60. In this manner, the counting operation of the counter circuit 59 continues until the scanning by the tiny laser spot reaches a subsequent line edge of the chip pattern so that a subsequent line edge position signal is delivered to the gate generating circuit 58. Thus, measurement of the line width of the chip pattern may be accomplished.

As already described in connection with FIG. 6, the directionality of the reflected light at a line edge of the chip pattern usually deviates in accordance with the shape of the fall at the line edge, and thus the output signals from the photoelectric conversion elements 25 and 28 are such as shown in FIGS. 7-a and 7-b. On the other hand, in the signal processing system shown in FIG. 9, the signal processing from the photoelectric conversion element 25 to the line edge position signal generating circuit 37 and the signal processing from the photoelectric conversion element 28 to the line edge position signal generating circuit 40 are entirely identical in circuit arrangement and therefore, when there are obtained the photoelectric conversion signals as shown in FIGS. 7-a and 7-b, only one of the photoelectric conversion signals for the line edge which exceeds a predetermined level may be selected and subjected to a signal processing which is excellent in S/N ratio, whereby line edge position signals corresponding to the line edge signals 26a and 26c of FIG. 7-a may be obtained from the line edge position detecting circuit 37 of FIG. 9 and a line edge position signal corresponding to the line edge signal 29b of FIG. 7-b may be obtained from the line edge position signal generating circuit 40 of FIG. 9. Also, where the directionality of reflection at the line edge of the chip pattern has little deviation so that there is obtained the photoelectric conversion signal as shown in FIG. 5, line edge position signals will be generated by the line edge signal generating circuits 37 and 40 at the same time in FIG. 9.

As already noted, the signal processing system in FIG. 9 is only exemplary, and various other methods may be used as the signal processing method for the line width measurement based on the principle of the present invention.

In FIG. 8, the image rotator 43 is inserted to vary the direction in which the chip pattern is measured. In order to change over the direction of measurement from the X-direction to the Y-direction, the image rotator 43 may be rotated through 45° whereby the direction in which the chip pattern is scanned by the tiny laser spot may be changed from the X-direction to the Y-direction and in accordance therewith, the photoelectric conversion elements 25 and 28 may be rotated through 90° to the positions 25' and 28', respectively.

Figure 11:
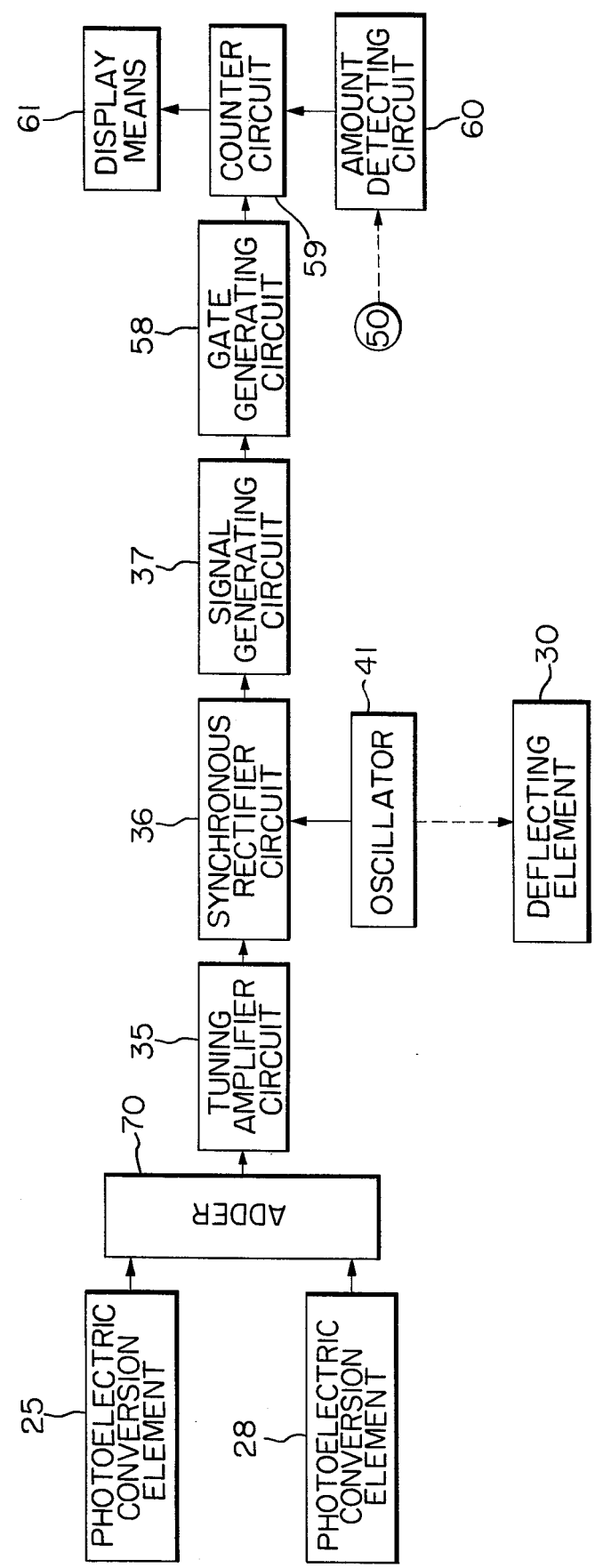
FIG. 11 shows another embodiment of the present invention.

FIG. 11 shows a second embodiment of the present invention. In the first embodiment, the signals from the photoelectric conversion elements 25 and 28 are discretely processed, whereas in the second embodiments the signals from the two photoelectric conversion elements are synthesized by an adder 70 and the subsequent electrical signal processing is effected by a single system. The second embodiment is entirely identical with the first embodiment in other respects.

According to the present invention, as has hitherto been described, the line width of an IC chip pattern formed on a semiconductor wafer may be automatically measured with an excellent S/N ratio and high accuracy, and without contacting the pattern. As already noted, the present invention is applicable not only to measurement of IC chip patterns but also to measurement of any object whose line edges have falls for diffracting the laser beam. Further, the IC chip pattern shown as the object to illustrate the invention is formed chiefly by parallel and straight line edges, but the tiny laser beam used to scan the objective pattern does not always require the pattern to be formed by straight line edges. The present invention will also be applicable to patterns having complex curved shapes if there is provided such a light receiving optical system which will cause the reflected light diffracted at the line edges to be efficiently directed to the photoelectric conversion elements.

What is claimed is:

1. An apparatus for photoelectrically detecting the position of each of the edges of a line having the opposite edges thereof formed substantially parallel to each other on a substrate, to thereby measure the width of the line, comprising:

a light source emitting coherent light;

means for condensing the coherent light into a tiny light spot smaller than the width of the line and illuminating said line with said light spot;

means for imparting to said tiny light spot a minute oscillation having an amplitude less than the width of said line;

means for moving said tiny light spot and said line relative to each other so that diffracted light may be created at each of the edges of said line;

first photoelectric converter means for receiving chiefly the diffracted light created at one of the edges of said line and producing an output signal modulated by said oscillation;

second photoelectric converter means for receiving chiefly the diffracted light created at the other edge of said line and producing an output signal modulated by said oscillation; and a circuit for producing position signals corresponding to the edges of said line in response to the modulated output signals from said first and second photoelectric converter means.

2. An apparatus according to claim 1, wherein said position signal producing circuit comprises:

first and second filter circuits for passing therethrough the frequency components of the output signals from said first and second photoelectric converter means which are between said oscillation frequency and twice said oscillation frequency;

first and second synchronous rectifier circuits for synchronously rectifying the output signals from said first and second filter circuits by using, as a reference signal, a signal of the same frequency as the oscillation frequency of said oscillation means and in phase with said oscillation; and first and second signal generating circuits for detecting the zero level positions of the output signals from said first and second synchronous rectifier circuits after said signals have exceeded a predetermined level and for generating first and second position signals thereupon; said apparatus further comprising means for detecting the amount of movement of said tiny spot with respect to said line and generating a number of pulses corresponding to said amount; and means for gate-controlling the pulses from said pulse generating means in accordance with said first and second position signals from said first and second signal generator circuits so as to start counting said pulses in response to said first position signal and terminate the counting in response to said second position signal, thereby counting said pulses.

3. An apparatus according to claim 1, wherein said position signal producing circuit comprises:

an adder circuit for adding together the output signals from said first and second photoelectric converter means and producing an output signal;

a filter circuit for passing therethrough the frequency components of the output signal from said adder circuit which are between said oscillation frequency and twice said oscillation frequency;

a synchronous rectifier circuit for synchronously rectifying the output signal from said filter circuit by using, as a reference signal, a signal of the same frequency as the oscillation frequency of said oscillation means and in phase with said oscillation; and means for detecting the zero level position of the output signal from said synchronous rectifier circuit after said output signal has exceeded a predetermined level and for generating a line edge position signal thereupon; said apparatus further comprising means for detecting the amount of movement of the tiny spot with respect to said line and for generating a number of pulses corresponding to said amount; and means for gate-controlling the pulses from said pulse generating means in accordance with successive line edge position signals and thereby counting said pulses.

* * * * *